(12) United States Patent
Schulz

(10) Patent No.: US 7,408,320 B2
(45) Date of Patent: Aug. 5, 2008

(54) APPARATUS FOR POWER CONTROL BY PHASE GATING AND A METHOD FOR HARMONIC REDUCTION

(75) Inventor: Detlef Schulz, Altenriet (DE)

(73) Assignee: Gerhard Kurz, Bad-Liebenzell-Monakam (DE)

(*) Notice: Subject to any disclaimer, the term of this patent is extended or adjusted under 35 U.S.C. 154(b) by 0 days.

(21) Appl. No.: 10/582,310

(22) PCT Filed: Oct. 26, 2004

(86) PCT No.: PCT/EP2004/012047

§ 371 (c)(1),
(2), (4) Date: Jun. 9, 2006

(87) PCT Pub. No.: WO2005/062455

PCT Pub. Date: Jul. 7, 2005

(65) Prior Publication Data

US 2007/0120521 A1    May 31, 2007

(30) Foreign Application Priority Data

Dec. 11, 2003 (DE) ................. 103 57 918

(51) Int. Cl.
*H02P 3/18* (2006.01)
(52) U.S. Cl. .............. 318/772; 318/786; 219/216
(58) Field of Classification Search ........... 318/772, 318/246, 786, 470, 471, 249; 315/312; 219/216, 219/505; 323/239, 323
See application file for complete search history.

(56) References Cited

U.S. PATENT DOCUMENTS 3,764,822 A * 10/1973 Ebbinge et al. ............. 307/141

(Continued)

FOREIGN PATENT DOCUMENTS

DE    21 31 750 A1    12/1972

(Continued)

OTHER PUBLICATIONS

S. Williamson, "Acoustic noise and pulsating torques in a triac-controlled permanent-split-capacitor fan motor", IEEE Proc., vol. 128, Pt. B, No. 4, Jul. 1981, pp. 201 to 206.

*Primary Examiner*—Paul Ip
(74) *Attorney, Agent, or Firm*—Harness, Dickey & Pierce, P.L.C.

(57) ABSTRACT

The invention relates to an apparatus for power control by phase gating of an AC voltage, which supplies an electrical load (14), and for reduction of harmonics which are created by the phase gating, in particular up to a region of 4 kHz, preferably in the region of the third harmonic, having a first circuit element (12) (TRIAC) which is connected in series with the load (14) and is driven by a control device (20) in order to carry out phase gating. The apparatus is distinguished in that a second circuit element (34) is provided in series with a resistance element (32), with the series circuit being arranged in parallel with the first circuit element (12) and with the control device (20) being designed such that it drives the second circuit element (34) shortly before the first circuit element (12) and switches it to the on state for a short time period. The invention also relates to a method for harmonic reduction in the range up to 4 kHz, preferably of the third harmonic, for power control by phase gating.

12 Claims, 2 Drawing Sheets

U.S. PATENT DOCUMENTS

| | | | | |
|---|---|---|---|---|
| 4,196,343 A * | 4/1980 | Han | ............ | 392/385 |
| 4,198,562 A * | 4/1980 | Mills et al. | ............ | 219/505 |
| 4,353,025 A * | 10/1982 | Dobkin | ............ | 323/300 |
| 4,687,985 A * | 8/1987 | Pitel | ............ | 323/323 |
| 4,820,934 A * | 4/1989 | Marcade et al. | ............ | 307/41 |
| 4,858,054 A * | 8/1989 | Franklin | ............ | 361/57 |
| 4,954,768 A * | 9/1990 | Luchaco et al. | ............ | 323/300 |
| 4,992,709 A * | 2/1991 | Griffin | ............ | 318/249 |
| 5,041,825 A * | 8/1991 | Hart et al. | ............ | 340/3.4 |
| 5,164,644 A * | 11/1992 | Hsieh | ............ | 318/284 |
| 5,245,764 A * | 9/1993 | Sung | ............ | 34/550 |
| 5,719,493 A * | 2/1998 | Higashi et al. | ............ | 219/216 |
| 5,747,973 A * | 5/1998 | Robitaille et al. | ............ | 323/239 |
| 5,955,794 A | 9/1999 | Schulz et al. | | |
| 6,864,659 B2 * | 3/2005 | Ratz et al. | ............ | 318/772 |
| 6,927,546 B2 * | 8/2005 | Adamson et al. | ............ | 315/312 |
| 7,061,204 B2 * | 6/2006 | Unno | ............ | 318/786 |
| 2003/0030408 A1 * | 2/2003 | Ratz et al. | ............ | 318/772 |
| 2004/0031395 A1 * | 2/2004 | Wroblewski | ............ | 99/281 |
| 2004/0212325 A1 * | 10/2004 | Adamson et al. | ............ | 315/312 |
| 2005/0184699 A1 * | 8/2005 | Unno | ............ | 318/786 |
| 2006/0273751 A1 * | 12/2006 | DeJonge et al. | ............ | 318/772 |
| 2007/0090780 A1 * | 4/2007 | Kress et al. | ............ | 318/246 |
| 2007/0114963 A1 * | 5/2007 | Steiner et al. | ............ | 318/772 |

FOREIGN PATENT DOCUMENTS

| | | |
|---|---|---|
| DE | 198 50 905 A1 | 5/2000 |
| DE | 100 52 910 A1 | 7/2002 |
| EP | 0 760 551 A | 3/1997 |
| EP | 0 859 452 A1 | 8/1998 |

* cited by examiner

US 7,408,320 B2

APPARATUS FOR POWER CONTROL BY PHASE GATING AND A METHOD FOR HARMONIC REDUCTION

CROSS-REFERENCE TO RELATED APPLICATIONS

This application is a U.S. National Stage Application of International Application No. PCT/EP2004/012047 filed Oct. 26, 2004, which claims priority to German Patent application DE 10357918.4, filed on Dec. 11, 2003.

BACKGROUND OF THE INVENTION

The present invention relates to an apparatus for power control by phase gating of an AC voltage, which supplies an electrical load, and for reduction of harmonics which are created by the phase gating up to a region of 4 kHz, preferably in the region of the third harmonic, having an electric motor as the load, having a first circuit element which is connected in series with the load and is driven by a control device in order to carry out phase gating, and having a resistance element. The invention also relates to a method for harmonic reduction in the range up to 4 kHz, preferably in the region of the third harmonic, for power control by phase gating.

An apparatus and a method for power control by means of phase gating are known, for example, from the article by S. Williamson et al. "Acoustic noise and pulsating torques in a TRIAC-controlled permanent-split-capacitor fan motor", IEE Proceedings, Vol. 128, Pt.B, No. 4, July 1981, pages 201-206, or the application DE 198 50 905 A1 from the same applicant.

Document DE 10052910 A1 discloses an electric machine which comprises a brake resistance directly mounted on the machine. DE 2 131 750 A discloses a circuit for reducing distortions caused by phase gating. The circuit comprises to TRIACs which are triggered in succession. EP 0 760 551 A2 discloses an electrical device for controlling heater. The device also comprises two TRIACs for switching the heater.

Generally apparatuses for phase gating are used to control the power which is supplied to an electrical load by periodically switching the load on and off via a circuit element. A TRIAC is normally used as the circuit element, is connected in series with the load, and is triggered via a control device. The control device has a series circuit comprising a resistor and a trigger capacitor, which is arranged in parallel with the TRIAC. The trigger signal is tapped off between the resistor and the trigger capacitor and is supplied to the control input (gate) of the TRIAC via a series circuit comprising a resistor and a trigger element in the form of DIAC. In addition to these control devices, which are designed in analog, integrated circuits have also in the meantime become available which carry out this drive function.

In the case of power control by phase gating of the AC voltage that is supplied to the load, undesirable harmonics are produced, whose extent is governed by European Standards. These Standards must be satisfied by the power control apparatuses, for which reason solutions in order to reduce these harmonics have been proposed in recent years.

The third harmonic in particular plays a special role in the reduction of harmonics, for which reason previous solutions have concentrated in particular on the reduction of these third harmonics. One example of an apparatus for reducing the third harmonic is disclosed, for example, in EP 0 859 452 B1 from the same applicant. In the solution disclosed there, the phase angle or trigger angle is varied by the control device by a predetermined value, for example in successive full cycles. The result of such asymmetry in the trigger angle leads to even-numbered harmonics which increase only slowly, and to greatly reduced odd-numbered harmonics.

Although this solution approach has been proven in practice and allows the existing Standards to be complied with in this way without any problems, there is, of course, still the desire to find an even more cost-effective solution. Furthermore, an apparatus would be desirable whose humming in the region of 25 Hz is considerably less than in the case of the apparatus disclosed in the abovementioned document.

SUMMARY OF THE INVENTION

Against this background, the object of the present invention is to provide an apparatus for power control by phase gating, which can be produced cost-effectively and furthermore has a better humming behavior.

In the case of the apparatus of the type mentioned initially, this object is achieved in that a second circuit element is provided in series with the resistance element, with the series circuit being arranged in parallel with the first circuit element, in that the control device is designed such that it drives the second circuit element shortly before the first circuit element and switches it to the on state for a short time period and in that the resistance element is arranged in an air flow which is produced by the electric motor in order to cool it.

In other words, this means that, because the second circuit element is switched on earlier, a current flow which is taken from the actual first circuit element once the latter has been triggered. Because of the resistance element, the current flowing through the second circuit element is less than that through the first circuit element. Overall, the second circuit element makes it possible to achieve a smoother rise in the current overall, thus reducing the harmonics. In particular, switching on the second circuit element results in harmonics which partially cancel out harmonics which occur on triggering of the first circuit element. Placing the resistance element in the air flow of the electric motor results in adequate cooling, so that there is no need for additional cooling measures.

Because of the small number of additional components which are required for power control for the apparatus according to the invention, production costs can be saved, but without adversely affecting the quality in terms of the reduction in harmonics.

The invention is thus in general based on the idea of allowing an amount of current which is less than the actual rated current flowing through the first circuit element to flow before the actual trigger process and before the TRIAC is switched on. In consequence, as mentioned, further harmonics which are created at an earlier time are formed, and at least partially cancel out harmonics from the actual phase-gating control.

It is preferable for the resistance element to be in the form of at least two resistance segments. The resistance segments are preferably located within the electric motor, so that they are well protected. Segmentation of the resistance element into at least two segments has the advantage that this allows better cooling, since the individual segments can be arranged separately from one another in the air flow of the electric motor.

It is also preferable for the resistance element to be in the form of a resistance wire, which is advantageous in terms of cost aspects. If a plurality of resistance segments are used, then they may each be in the form of a resistance wire.

In one preferred development, the resistance element is provided as part of a winding of the electric motor (for example of the field winding). The resistance element can thus be applied to the motor winding, for example, in the form of a plurality of turns. This measure likewise allows simple production of the resistance element, with good cooling still being ensured.

A TRIAC is preferably used as the circuit element. It is also preferable for the resistance element to be in the form of a simple non-reactive resistor. Other resistance elements may, of course, also be used, for example inductive or capacitive resistors. However, it has been found that non-reactive resistors are in fact most suitable with regard to their physical size and the costs.

The object on which the invention is based is also achieved by a method for harmonic reduction in the range up to 4 kHz, preferably of the third harmonic, for power control by phase gating, having the following steps:

- a first circuit element, preferably a TRIAC, is driven on the basis of a first selected trigger angle in order to carry out a phase gating process,
- a connection which bridges the first circuit element and has a resistance is switched on briefly immediately before the triggering of the first circuit element, and
- the connection which has a resistance is cooled by the electric motor.

As already stated above, a TRIAC is used as the switchable connection which has a resistance, and this TRIAC is connected in series with a non-reactive resistor in parallel with the first circuit element.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

The invention will now be explained in more detail using one exemplary embodiment and with reference to the drawing, in which.

DETAILED DESCRIPTION OF PREFERRED EMBODIMENTS

Figure 1:
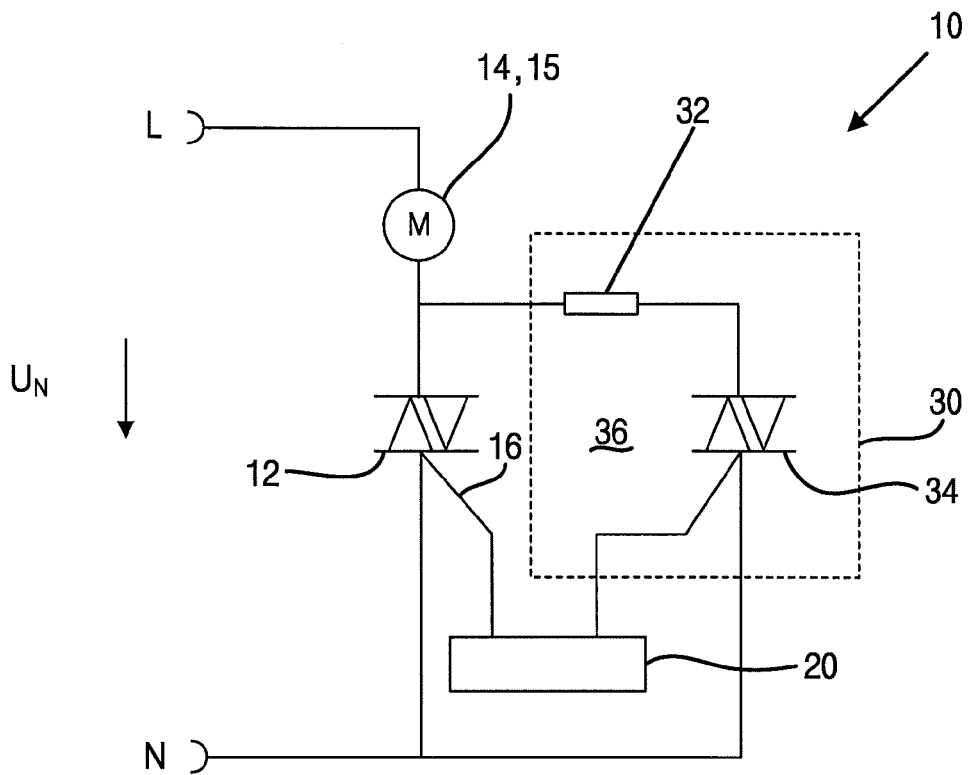
FIG. 1 shows a schematic block diagram of an apparatus according to the invention for power control.

An apparatus for power control is shown in FIG. 1 and is designated with the reference symbol 10. The power is controlled by means of the phase gating process, which has been known for a long time and need not be explained again at this point.

In order to carry out phase gating, the apparatus 10 has a TRIAC 12 which is arranged in series with the load 14 to be controlled. The series circuit comprising the TRIAC 12 and the load 14 is fed from an AC voltage supply network $U_N$, with the two poles being annotated L and N.

The load 14 is an electric motor 15, preferably for a vacuum cleaner, which represents an inductive load.

The TRIAC 12 is connected via its control input (gate) 16 to a control device 20 which produces trigger pulses that correspond to the desired power, and supplies them to the control connection 16.

Either a circuit in discrete form which, for example, has a trigger capacitor for production of the trigger pulse, can be concealed downstream from this control device 20. The control device may, of course, also be in the form of an integrated circuit.

When a trigger pulse is emitted, the TRIAC 12 is switched on, so that the load 14 can be supplied with power. The TRIAC 12 remains switched on until the end of the half-cycle of the supply voltage, and then changes to the off state. The power can be controlled by appropriate choice of the trigger time within one half-cycle of the supply voltage.

This type of power control results in harmonics being produced, which are fed back into the AC voltage supply network. However, on the basis of European Standards, these harmonics must not exceed specific magnitudes. Because of this, it is necessary to take special precautions in order to reduce these harmonics.

Figure 2:
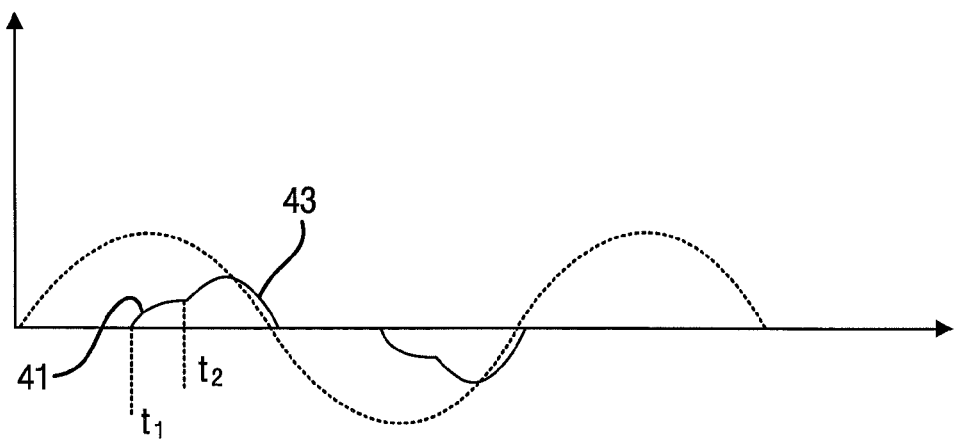
FIG. 2 shows a diagram in order to illustrate the voltage and current waveforms.

A circuit unit 30 is provided for this purpose in the apparatus 10. This circuit unit 30 has the task of allowing an amount of current which is less than the actual rated current to flow through the load 14 before the actual trigger time. This amount of current is annotated with the reference symbol 41 in FIG. 2. As can clearly be seen, this amount of current 41 starts to flow before the actual current that flows after the triggering of the TRIAC 12 and which is annotated with the reference symbol 43. The time difference between the time t1 of the smaller amount of current 41 and the time t2 of the rated current 43 is about 1-2 ms and may vary depending on the trigger angle. In particular, the difference can be set to zero in the case of very small and/or very large trigger angles, which leads to the circuit unit 30 remaining ineffective.

Since a small amount of current 41 flows before the actual rated current 43, this results in an overall current through the load 14 whose rise is thus considerably flattened. This flattening has the effect of reducing the creation of harmonics, in particular by destructive interference of the harmonics, which can be associated with the amount of current 41 and the rated current 43.

Overall, this type of control actually makes it possible to reduce the lower harmonics and in this case in particular the third harmonic.

The function of the circuit unit 30 is achieved in the present exemplary embodiment by a series circuit comprising a resistor 32 and a TRIAC 34, which are arranged in parallel with the TRIAC 12. In consequence, when the TRIAC 34 is switched on, a current path is formed between one pole of the supply voltage via the load 14, the resistor 32 and the TRIAC 34 to the second pole N. In this case, the TRIAC 12 is bridged.

The TRIAC 34 is likewise driven via the control device 20, supplying the trigger pulses to the control input 36 (gate) of the TRIAC 34. As already mentioned, this trigger pulse is produced at a time t1 which occurs before the time t2 of the actual trigger pulse which is supplied to the TRIAC 12. The corresponding difference between t2-t1 may, for example, be permanently preset or may be set by the control device 20, depending on the trigger angle of the trigger pulse, to the TRIAC 12.

The resistor 32 which is provided in the circuit unit 30 is preferably in the form of a non-reactive resistance and ensures that the current 41 does not reach the magnitude of the rated current 43. A resistance in the region of, for example, 10 ohms has been found to be particularly advantageous.

As already mentioned, the TRIAC 12 is briefly bridged before its triggering by the circuit unit 30, so that a current can flow through the load 14. This process is repeated periodically in each half-cycle of the supply voltage.

As already mentioned, the resistor 32 is preferably a non-reactive resistance. A simple resistance wire has been found to be particularly cost-effective in this case. In order to achieve good positioning, the resistance wire is provided in the form of at least two individual mutually independent resistance wire segments which are electrically connected to one another.

Since the resistor 32 has a very low resistance, a relatively large current flows so that a large amount of power is accordingly produced in the form of heat. In order to prevent damage to the resistor, it must therefore be cooled.

Figure 3:
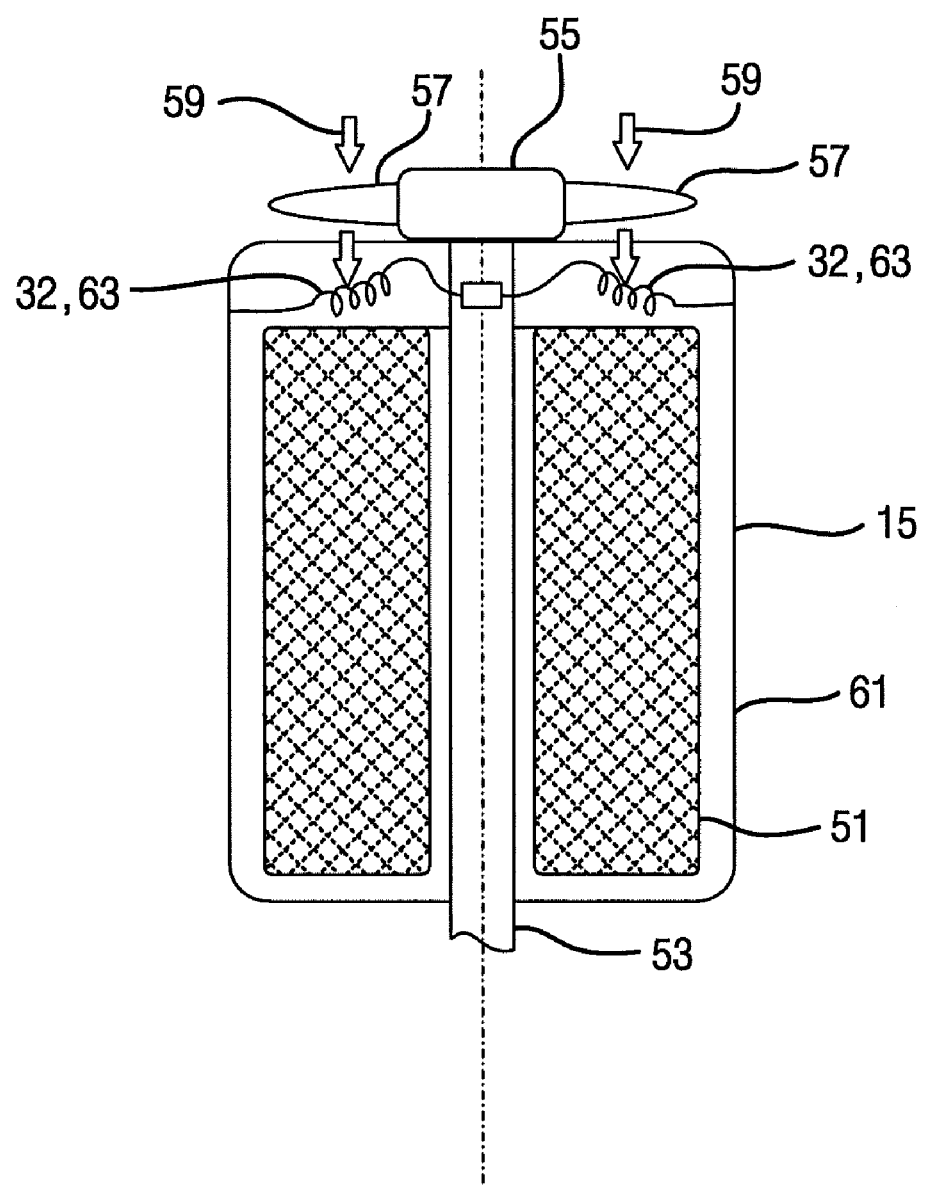
FIG. 3 shows a schematic illustration of an electric motor.

FIG. 3 shows a schematic section view illustration of the electric motor 15, in which only the most important parts can be seen, for the sake of clarity.

The electric motor 15 has a winding 51 which is used to drive a shaft 53. A fan impeller 55 with vanes 57 is fitted to one end of the shaft 53. This fan impeller 55 is coupled in a fixed manner to the shaft 53, so that it rotates with the shaft 53. The shape of the vanes 57 is chosen such that their rotation produces an air flow, which is indicated by arrows 59 in the figure. In consequence, in the present exemplary embodiment, air is blown from the fan impeller 55 outwards in the direction of the winding 51.

The air flow which is produced by the fan impeller 55 may, of course, also be chosen to be in the opposite direction.

A plurality of resistance wires 63, for example four resistance wires 63, are provided within a housing 61 of the electric motor 15 and form the already explained resistor 32. The four resistance wires are connected in series and arranged distributed uniformly over the cross section through which the air flows. The resistance wires are connected externally via two connecting points a, b. These two connecting points a, b are also shown in FIG. 1. As can be seen, the connecting point a is connected to the motor, and the connecting point b is connected to the TRIAC 34.

As can clearly be seen from FIG. 3, the resistance wires 63 are located between the winding 51 and the fan impeller 55. Furthermore, the resistance wires 63 are placed within the air flow 59, so that this air flow which is produced by the fan impeller 55 passes over the resistance wires 63.

This air flow allows the resistance wires 63 to be adequately cooled during operation, so that there is no need for any further cooling elements, etc. Since the fan impeller 55 is provided in any case, to be precise in order to cool the electric motor itself, no additional measures are required for this purpose, either.

It should also be noted that the choice of four resistance wires is purely exemplary. It is self evident that both more than four resistance wires and only one resistance wire may be used. In general, however, it is advantageous to segment the resistor 32 in order to allow an arrangement which is distributed better in the air flow.

It is thus evident that a very simple and cost-effective solution has been found for cooling of the resistance wires that are used.

It is also evident that a very simple and cost-effective circuit unit 30 allows a reduction in the harmonics, so that the applicable Standards can be satisfied. Furthermore, it has been found that it was possible to considerably reduce the humming noise produced by previous circuit units for harmonic reduction.

The invention claimed is:

1. Apparatus for controlling the power of an AC supply voltage supplying an electric motor by phase control and for reducing harmonics caused by said phase control, comprising a first switching element connected in series with said electric motor and driven at a first firing angle into a conducting state by a control device for performing a phase control of said electric motor during a given half cycle of the AC supply voltage, and a second switching element and a resistor element both being electrically connected in series to form a series connection, said series connection being connected in parallel to the first switching element, said control device driving the second switching element at a second firing angle into a conducting state at a first point in time (t1) during said given half cycle that is shortly before a second point in time (t2) when the first switching element is driven into the conducting state; the improvement comprising a fan coupled to said electric motor for generating an airflow to cool said electric motor, and arranging said resistor element in said airflow to cool the resistor element.

2. The apparatus as claimed in claim 1, wherein the resistance element has at least two resistance segments which are arranged in series.

3. The apparatus as claimed in claim 2, wherein the resistance segments are arranged within the electric motor.

4. The apparatus as claimed in claim 3, wherein each resistance segment is in the form of a resistance wire.

5. The apparatus as claimed in claim 2, wherein each resistance segment is in the form of a resistance wire.

6. The apparatus as claimed in claim 1, wherein the resistance element is in the form of a resistance wire.

7. The apparatus as claimed in claim 6, wherein the resistance wire is provided in the form of at least one turn on a winding of the electric motor.

8. The apparatus as claimed in claim 1, wherein the second circuit element is a TRIAC.

9. The apparatus as claimed in claim 1, wherein the resistance element is a non-reactive resistor.

10. The apparatus as claimed in claim 1, wherein said harmonics created by the phase control and to be reduced by the apparatus comprise harmonics up to a region of 4 kHz.

11. The apparatus as claimed in claim 10, wherein said harmonics are in the region of the third harmonic.

12. The apparatus as claimed in claim 1, wherein the electric motor has a motor winding and a motor shaft and the fan is connected to the motor shaft for generating an airflow across said motor winding, and further wherein said resistor element is disposed between said fan and said motor winding.

* * * * *